(12) United States Patent
Chen et al.

(10) Patent No.: US 8,094,940 B2
(45) Date of Patent: Jan. 10, 2012

(54) INPUT METHOD TRANSFORM

(75) Inventors: Guoyou Chen, Austin, TX (US); Li Li, Austin, TX (US); Su Liu, Round Rock, TX (US); Xinhua Wu, Austin, TX (US); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 955 days.

(21) Appl. No.: 11/874,224

(22) Filed: Oct. 18, 2007

(65) Prior Publication Data

US 2009/0103809 A1    Apr. 23, 2009

(51) Int. Cl.
*G06K 9/18* (2006.01)
*G06K 9/36* (2006.01)

(52) U.S. Cl. ........................................ 382/185; 382/276

(58) Field of Classification Search .................. 382/181, 382/185–187, 229, 254, 276; 704/1–4, 8–9, 704/251
See application file for complete search history.

(56) References Cited

U.S. PATENT DOCUMENTS

| | | | |
|---|---|---|---|
| 4,934,851 A | 6/1990 | Sasaki | |
| 5,050,071 A | 9/1991 | Harris et al. | |
| 5,067,070 A | 11/1991 | Miyao et al. | |
| 5,251,130 A | 10/1993 | Andrews et al. | |
| 5,258,910 A | 11/1993 | Kanza et al. | |
| 5,262,948 A | 11/1993 | Kato | |
| 5,523,945 A | 6/1996 | Satoh et al. | |
| 5,644,775 A | 7/1997 | Thompson et al. | |
| 5,673,390 A | 9/1997 | Mueller | |
| 5,715,460 A | 2/1998 | Acker et al. | |
| 5,873,107 A | 2/1999 | Borovoy et al. | |
| 5,900,004 A | 5/1999 | Gipson | |
| 5,970,492 A | 10/1999 | Nielsen | |
| 5,983,208 A | 11/1999 | Haller | |
| 6,044,205 A | 3/2000 | Reed et al. | |
| 6,266,811 B1 | 7/2001 | Nabahi | |
| 2003/0046526 A1* | 3/2003 | Zhang et al. | 713/1 |
| 2004/0260535 A1 | 12/2004 | Chen et al. | |
| 2005/0155017 A1 | 7/2005 | Berstis et al. | |

(Continued)

FOREIGN PATENT DOCUMENTS

CA          2279091 A1    1/2001

OTHER PUBLICATIONS

Meiwes et al.. "Software Component Library and Electronic Library Catalog", IBM Technical Disclosure Bulletin, Jun. 19978, pp. 27-30.

(Continued)

*Primary Examiner* — Daniel Mariam
(74) *Attorney, Agent, or Firm* — Yee & Associates, P.C.; David A. Mims, Jr.

(57) ABSTRACT

Illustrative embodiments provide a computer implemented method, a data processing system and a computer program product for transforming character data input between a first writing system and a second writing system. The computer implemented method comprises receiving character data input of a first writing system and ensuring the character data input contains normalized characters. A predefined transform is selected based on the character data input of the first writing system and output to a second writing system to transform the normalized characters of the first writing system to character data output of the second writing system, and providing the character data output to a display process.

18 Claims, 4 Drawing Sheets

U.S. PATENT DOCUMENTS

2009/0006075 A1* 1/2009 Krishnan et al. .................. 704/2
2010/0245230 A1* 9/2010 Yaun ............................. 345/156

OTHER PUBLICATIONS

Schell et al., "On-the-Fly Message Translation for National Language Software Installations", IBM Technical Disclosure Bulletin, Aug. 1997, pp. 31-32.

U.S. Appl. No. 09/621,801, Filed Jul. 21, 2000, Brian Farn.
USPTO Office Action for U.S. Appl. No. 09/621,801 dated Nov. 21, 2003.
USPTO Office Action for U.S. Appl. No. 09/621,801 dated May 6, 2004.
USPTO Office Action for U.S. Appl. No. 09/621,801 dated Nov. 9, 2005.

* cited by examiner

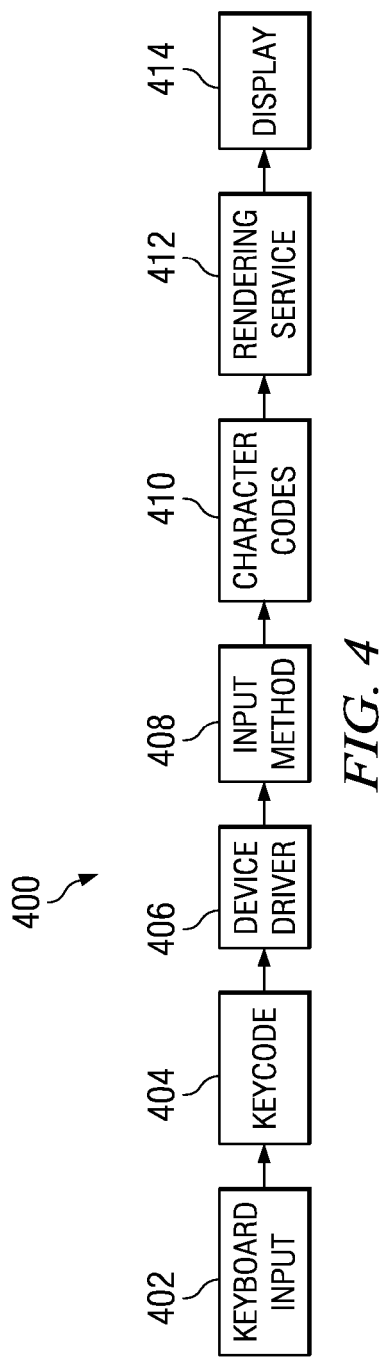

INPUT METHOD TRANSFORM

BACKGROUND OF THE INVENTION

1. Field of the Invention

The present invention relates generally to an improved data processing system, and in particular to a computer implemented method, apparatus, and a computer program product for an input method capable of transforming character data input in one writing system to corresponding character data of a related writing system.

2. Description of the Related Art

Input methods have been developed to accommodate the various languages and scripts of users around the world. For example, the Chinese language includes standard scripts or sets of characters known as Simplified Chinese and Traditional Chinese. Simplified Chinese is primarily used in mainland China and Singapore, while Traditional Chinese is used in Hong Kong and Taiwan. Many of the computer operating systems and applications provide support for both scripts.

The primary difference between Simplified and Traditional Chinese is in the system of writing involving the structure of the characters, rather than in the pronunciation or grammar. Therefore, a person from mainland China can converse with a person from Taiwan with relative ease, but may have difficulties when communicating in a written form.

While one-to-one mappings between Simplified and Traditional Chinese characters exist for many characters, one-to-many mappings also are present. In these cases, one Simplified Chinese character will have more than one Traditional Chinese equivalent. A one-to-one phrase mapping may be used to resolve the one-to-many character mapping problem. A Chinese phrase usually consists of between two to four characters and a Simplified Chinese phrase typically has an equivalent Traditional Chinese phrase.

Chinese input methods have been created to accommodate the entering of Chinese characters of either writing system. These input methods support either structure based input or phonetic based input. While input methods have been designed to support the two different input styles, an input method typically only supports one style. In cases where the input method supports both Simplified and Traditional character sets, the user has to be proficient at using both character sets. Most users of Chinese character sets are comfortable using one or the other character set and not both. For example, a user who is adept at the use of Simplified Chinese will typically have difficulty using Traditional Chinese character input. In a similar manner, the Traditional Chinese character user would typically have problems if required to use a Simplified Chinese character input.

Tools exist for the translation or conversion of characters from one character set to another. These tools typically focus on translating a character, or string of characters, in a coded character set into an equivalent character, or string of characters, in another coded character set. Problems still arise when the difference between the source and target characters involve different character sets with different input methods in multiple writing systems.

SUMMARY OF THE INVENTION

Illustrative embodiments provide a computer implemented method, a data processing system and a computer program product for transforming character data input between a first and second writing system. In one illustrative embodiment, the computer implemented method comprising receiving the character data input of a first writing system and determining a transform function is enabled, and further responsive to the transform function being enabled, determining whether the character data input comprises normalized characters, and responsive to determining the character data input not normalized, normalizing the character data input to create normalized characters. Further, the method comprising selecting a predefined transform based on the character data input of the first and output to the second writing system, transforming the normalized characters of the first writing system to character data output of the second writing system, and providing the character data output to a display process.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of a simplified view of character data input processing of a data processing system of FIG. 3, in accordance with illustrative embodiments;

FIG. 5 is a tabular view of a logical representation of a mapping table in accordance with illustrative embodiments.

DETAILED DESCRIPTION OF THE PREFERRED EMBODIMENT

Figure 1:
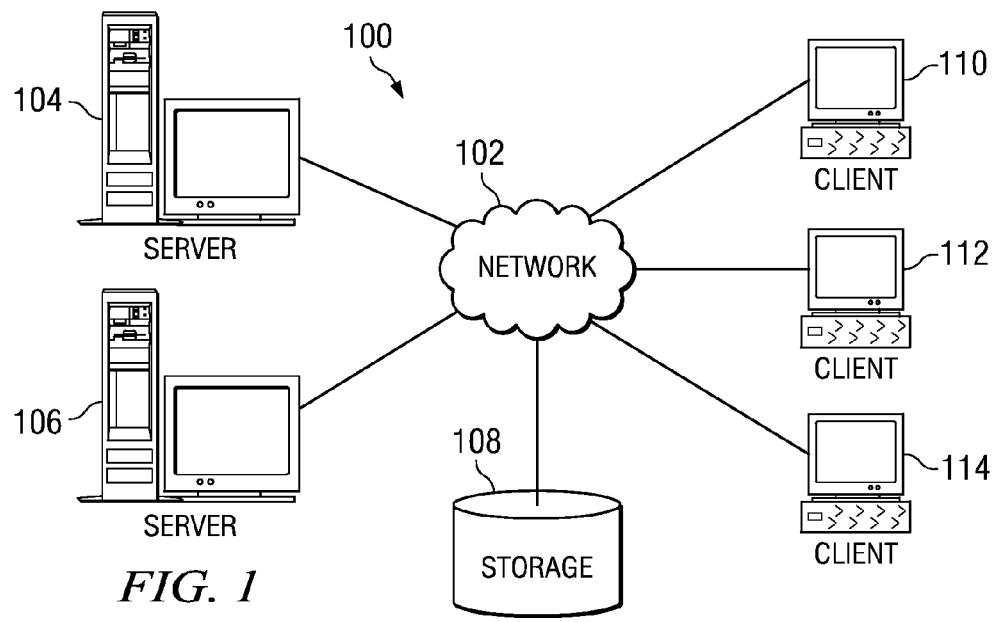
FIG. 1 is a pictorial representation of a network of data processing systems in which illustrative embodiments may be implemented.
Figure 2:
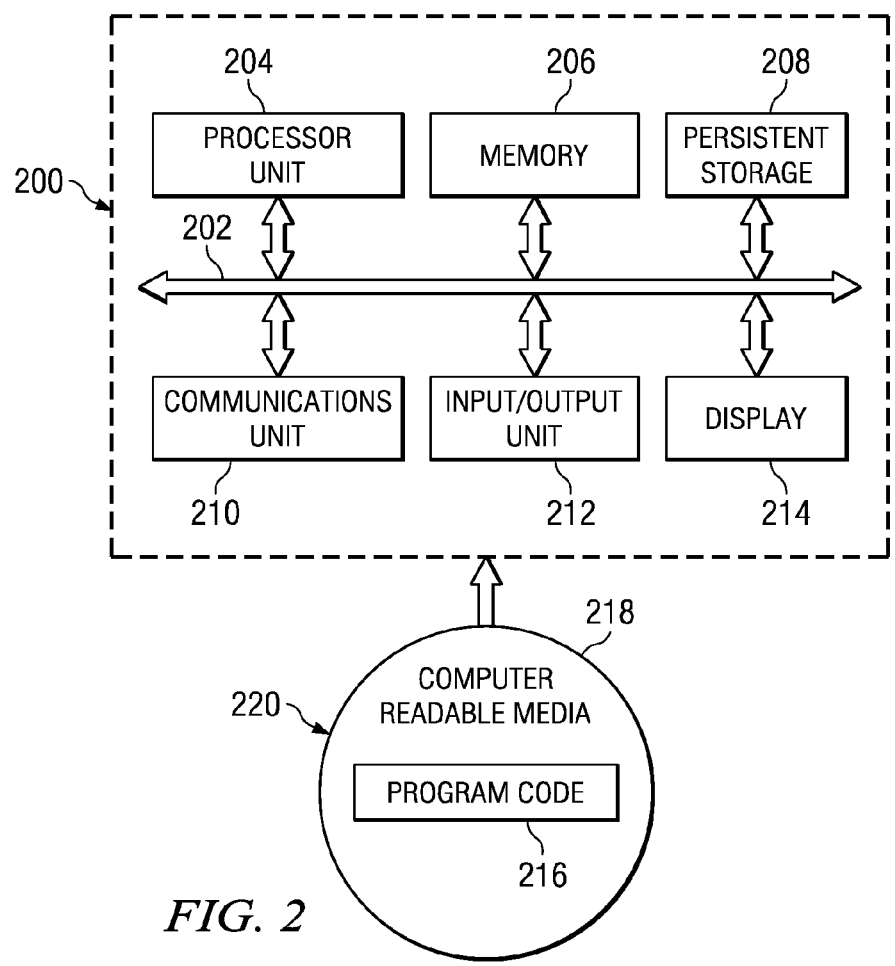
FIG. 2, is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

Illustrative embodiments may be used within the context of the network of data processing systems to allow users of a system using one writing system to provide information to a user or application on another system in another corresponding writing system. The transform services provided on a first system, for example using the Simplified Chinese character set as input, would allow a user to enter characters needed for a Traditional Chinese character data search or to complete a form. Users of Simplified Chinese script, for example, who need to occasionally input data in a Traditional Chinese format may find the services particularly useful. Through the transformation services provided, users will typically achieve easier correspondence between the two writing systems.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache, such as found in an interface and memory controller hub that may be present in communications fabric 202.

Figure 3:
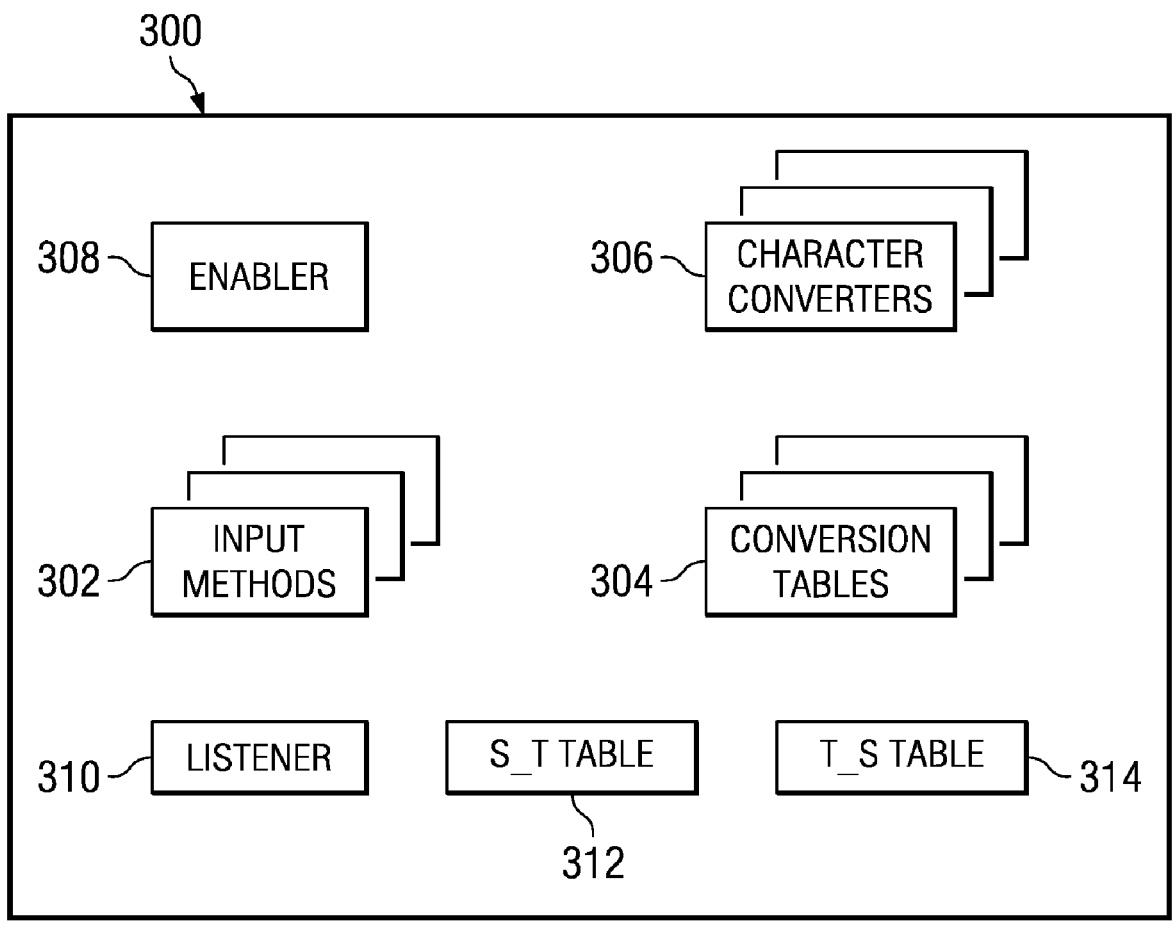
FIG. 3 is a block diagram of further detail of components of the data processing of FIG. 2, in accordance with illustrative embodiments.

With reference to FIG. 3, a block diagram of further detail of components of the data processing system 200 of FIG. 2 in which illustrative embodiments may be implemented is shown. The components of system 300 are meant to be an instance of data processing system 200 in accordance with illustrative embodiments and not exhaustive in terms of providing details of every system component. Although depicted and discussed in terms of software components, actual implementations may use a combination of hardware and software, or software alone, to realize the function of the described components.

System 300 contains a set of input methods 302, providing character data input for the system. Character data input typically comprises a user interacting with a system through a keyboard. The keyboard accepts keystroke input that is further processed by the keyboard driver and input method editors in conjunction with rendering services to place textual data in a file or display screen. Character data in a simple for may consist of common characters A to Z as well as numbers and special characters; however it also includes characters of other alphabetic and non-alphabetic scripts such as those of the Asian languages. Conversion tables 304 and character converters 306 combine to form the character data conversion support of the system. Conversion tables 304 are the resources used by the character converters 306.

Enabler 308 is the mechanism that provides the capability to selectively activate the input method transform process for character data input. Enabler 308 may be implemented as a controller in the form of a simple environment variable, a keystroke, or combination of keystrokes. It may further be implemented as a selection from a choice of menu items presented to a user, desktop icon, or dynamically configurable system property. Through the use of enabler 308, users or administrators can determine when to use the capabilities of the input method transform function.

Listener 310 is shown as a component outside of input methods 302, but alternatively may be implemented as a feature of input methods 302. When implemented as a separate component or add-on to input methods 302, the listener provides the capability to determine the character or string of characters that needs to be processed using the input method transform function. When listener 310 is implemented as a feature of input methods 302, it performs the same function, but the packaging differs.

S_T table 312 represents the mapping table to be used when mapping character input from Simplified Chinese to Traditional Chinese and T_S table 314 represents the mapping table to be used when mapping character input from Traditional Chinese to Simplified Chinese. Mapping tables may comprise a combination of entries for both characters and phrases in a single table per writing system or one table may be specific to character data input of the script, while another table may be used for phrases comprised of combinations of characters related to the character set.

For example, when mapping the Simplified Chinese character data input to Traditional Chinese character data there may be a mapping table comprising entries for both individual characters and phrases, or there could be a mapping table for individual characters and another mapping table for the phrases containing combinations of multiple characters. The tables defining the relationship of the individual characters and phrases may be implemented as extensions to the existing set of resources for character data conversion. Typically, character data conversion comprises a set of converters and mapping tables that are stored on persistent storage devices such as persistent storage 208 of FIG. 2 until needed by a requester.

By way of a non-limiting example, a UNIX™ system may be used to implement system 300. The operating system provided support of data conversion, the presentation or windowing environment, input method editors and support for various keyboards can be used as a foundation in combination with the features described. In a similar manner other operating systems or platforms that provide similar basic character data input and output functions maybe enhanced to provide the support of system 300.

With reference to FIG. 4, a block diagram of a simplified view of character data input processing of a data processing system of FIG. 3, in which illustrative embodiments may be implemented is shown. Process 400 provides an overview of the components that may be typically involved in the input and output of character data. Much of the support for character data is provided in the front end of systems in the form of input/output unit 212 and display 214 of FIG. 2. Services that are bundled with the input/output unit 212 and display 214 components provide a mechanism allowing a user to interact with the system. Rendering services, a part of the display 214 component of FIG. 2 comprises a complex set of services taking raw keyboard data in and producing graphic images as output.

Process 400 begins with keyboard input 402 from a device, such as a keyboard, a stylus selecting characters on a tablet, or perhaps a user touching characters on a screen. The input device typically creates keycode 404 that is raw keystroke data received by a device driver 406. The device driver transforms the keycode 404 into character codes and sends the character codes to input method 408. The input method 408 is an instance of input methods 302 of FIG. 3 processes the character codes 410 as needed and passes them along with other formatting information to rendering service 412. Rendering service 412, a part of a display 214 of FIG. 2 or also referred to as a presentation service performs the glyph selections based on the data provided and applies any requested formatting to the data which is then sent as output to display 414 for viewing by the user. Display 414 is presumed to be connected to a display adapter with an associated display driver, for example, as an instance of display 214 of FIG. 2.

With reference to FIG. 5, a tabular view of a logical representation of a mapping table in which illustrative embodiments may be implemented is shown. For example, table 500 may be viewed as a resource such as that of conversion tables 304 of FIG. 3. Conversion tables may be implemented in a variety of forms depending upon the surrounding support. For example, a data conversion table is typically optimized for use with a particular data converter. Table 500 represents a logical view of elements that may comprise a correspondence or mapping table to transform the character data input from the script of a first writing system into the character data output of a corresponding script of a second writing system. The table defines the relationship between an input entry and an output entry, along with comments that may be helpful to the administrator of the data in the table.

For example, row 502 contains heading information indicative of the content of the representative columns. From a programming perspective, one need not implement the headings in code, however the headings serve an informative purpose to aid in maintenance.

Char_in_1 504 represents the first character data input value, while char_out_1 506 represents the first corresponding output character data value. Comment 508 is associated with the two mapping entries within the row and indicates the mapping is a one-to-one mapping. The one-to-one mapping comment indicates that a single character input resolves to a single character output.

Char_in_3 510 represents the third character data input value, while char_out_3, char_out_4, char_out_5, and char_out_6 512 represents the possible third corresponding output character data value. Comment 514 is associated with the two mapping entries within the row and indicates the mapping is a one-to-many mapping. The one-to-many mapping comment indicates that a single character input maps to many characters of output. The output is resolved to one of the characters based on user selection, or input of more characters, until a phrase mapping is found as described below.

In a similar manner to that of characters, phrases are mapped as well. For example, phrase_in_1 516 represents the first phrase character data input value, while phrase_out_1 518 represents the first corresponding output phrase character data value. Comment 520 is associated with the two mapping entries within the row and indicates the mapping is a one-to-one mapping. The one-to-one mapping comment indicates a single phrase character data input resolves to a single phrase character data output.

Phrase_in_3 522 represents the third phrase character data input value, while phrase_out_6, phrase_out_7, and phrase_out_8, 524 represents the third corresponding output phrase character data value. Comment 526 is associated with the two mapping entries within the row and indicates the mapping is a one-to-many mapping. The one-to-many mapping comment indicates a single phrase of character data input resolves to many characters of output forming a number of phrases. The output is resolved to one of the phrases based on user selection, or input of more characters, until a mapping of a longer phrase is found.

Phrase_in_n 528, phrase_out_n 530 and comment 532 form the last entry in the table. The exemplary view may be formed in other ways, as is known in the art. For example, the table may be split to create two separate tables; one contains the character to character mapping, while the other containing the phrase mappings. In yet another variation, the phrases could be ordered first in a consolidated view table. In yet another illustrative embodiment, the table entries could be ordered based on the frequency of use, having high usage characters or phrases ordered before other characters or phrases. Indexing techniques may also be used to provide faster access to table entries.

Figure 6:
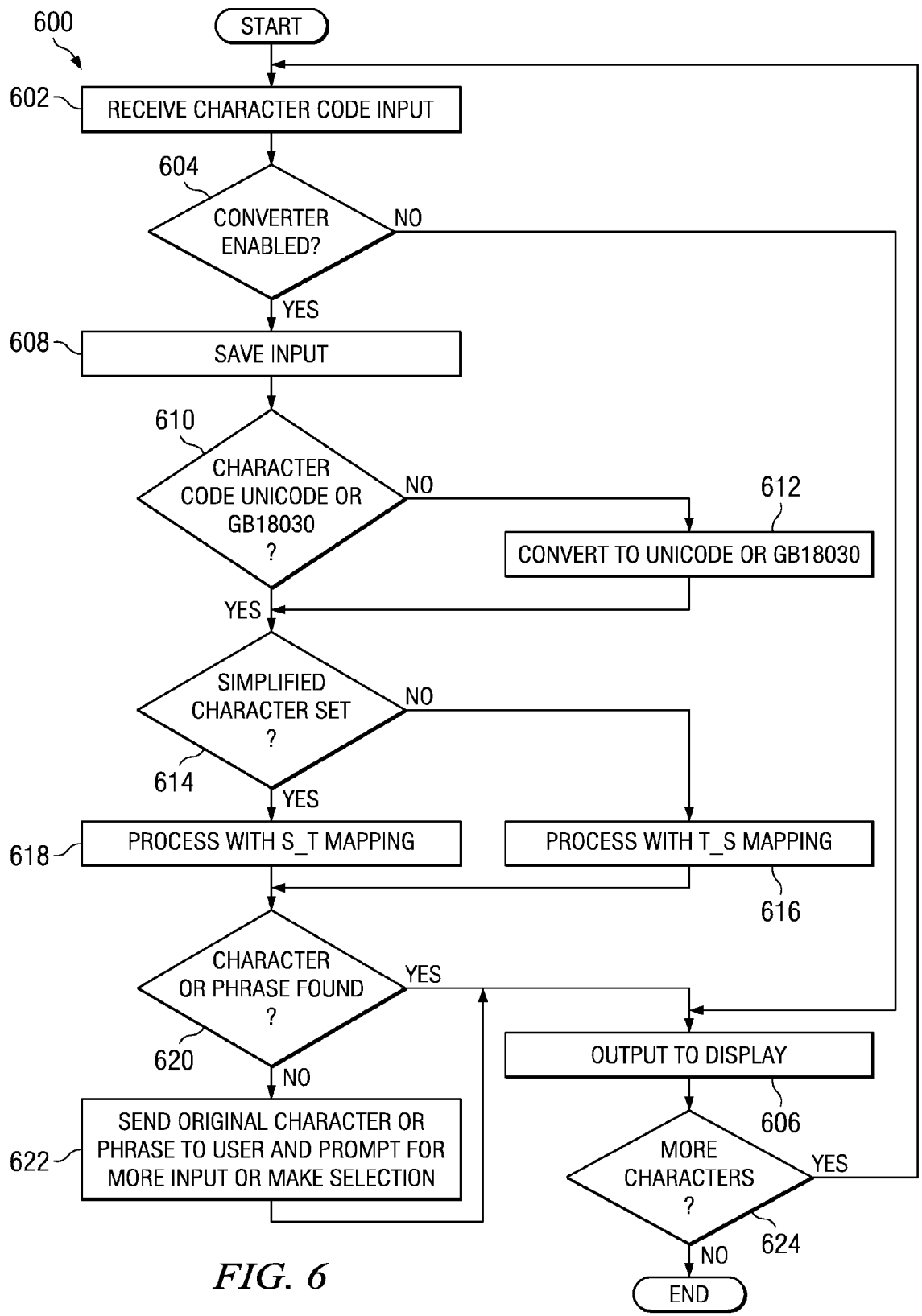
FIG. 6 is a flowchart of a character mapping process in accordance with illustrative embodiments.

With reference to FIG. 6, a flowchart of a character mapping process of transforming character data in script of a first writing system to character data in a script of a second writing system in accordance with illustrative embodiments is presented. Process 600 begins with the receipt of character code input. The character code input may reside within buffers managed by the input methods 302, or other memory location accessible to listener 310 of FIG. 3 (step 602). Process 600 may be a functional component of input methods 302, or may be a function of listener 310, depending upon the implementation chosen. For this example, reference is made to process 600 in a general implementation independent sense.

A determination is made regarding the enablement status of the conversion function (step 604). If the conversion function is enabled, a "yes" in step 604, the listener is active (if that implementation was chosen) and the character code data input is stored temporarily for later use (step 608). The data is analyzed to determine if the data in its initial form is in a normalized form of either "Unicode" or "GB18030" code format (step 610). Both Unicode (an industry standard) and GB18030 (a national standard for the Peoples Republic of China) are recognized standards for coding of character data. Both standards include all characters required to support the scripts of Simplified and Traditional writing systems. An initial form may be one of many known character data coding formats, such as those prescribed by national, international or industrial standards.

If a "yes" is returned in step 610, processing moves to determine if the character data is Simplified Chinese character data (step 614). If a "yes" is determined in step 614, the Simplified Chinese input mapping table is selected for use (step 618). Processing of the input characters uses the mapping table selected in step 618. A determination is made, during the mapping, with respect to locating the desired character, or phrase, within the mapping table resource (step 620). If the desired character or phrase supplied on input cannot be resolved to an output value, a "no" is obtained in step 620. If a character mapping was achieved as desired, a "yes" would result in step 620.

If a "no" response was obtained in step 610, process 600 would invoke a character data converter to convert, or normalize, the input character data into Unicode or GB18030 character data (step 612). Having converted or normalized the character data in step 612, process 600 would move to step 614.

If a "no" was obtained in step 614, the character data input is presumed to be Traditional Chinese and the Traditional Chinese mapping tables are selected for use (step 616). Process 600 moves to step 620.

If the response was "no" in step 620, processing would move to obtain the original input character values stored in step 608 and send the character values to output to the display process along with a prompt for the user to provide more character input, or to make a selection from choices presented, such as a list of characters or phrases that may be appropriate (step 622).

If the response from step 620 was "yes", process 600 would send the output of the character data mapping obtained to output to display process (step 606).

A determination is then made regarding the availability of more characters to process (step 624). If "no" is obtained in step 624, process 600 ends as all desired character data processed have been sent to output to the display process, otherwise process 600 reverts to step 602 to obtain more character code input data.

Thus, the illustrative embodiments provide an exemplary input method transform function allowing users to selectively determine when the function should be available for use. When used, illustrative embodiments of the input method transform function provide features for efficient conversion services for character data, allowing users of Simplified Chinese character data to input Traditional Chinese character data and users of Traditional Chinese character data to input Simplified Chinese character data. For example, a user normally working with Simplified Chinese character data may occasionally have a need to provide character data information using Traditional Chinese character data. The user would key in the information using the Simplified Chinese characters and be presented with the corresponding Traditional Chinese equivalents. The transform may be mostly transparent to the user. In some cases, where more than one result based on the input is provided, the user would typically be prompted to select a result from a set of results or be requested to provide more input to increase the accuracy of the output. The capability of one-to-many and many-to-one mappings, provided in support of both characters and phrases, typically enhances the quality of output without the need to change hardware or to adopt different input techniques thereby maintaining their comfort level using a preferred character set.

The invention can take the form of an entirely hardware embodiment, an entirely software embodiment or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable recordable type medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications, as are suited to the particular use contemplated.

What is claimed is:

1. A computer implemented method for transforming character data input, the computer implemented method comprising:
   receiving the character data input from a first writing system;
   determining whether a transform function is enabled;
   responsive to the transform function being enabled, determining whether the character data input comprises normalized characters;
   responsive to determining the character data input not normalized, normalizing the character data input to create normalized characters;
   selecting a predefined transform based on the character data input of the first writing system and output to a second writing system;
   transforming the normalized characters of the first writing system to character data output of the second writing system; and
   providing the character data output to a display process.

2. The computer implemented method of claim 1 wherein the normalizing further comprises conversion from an initial form to one of a Unicode and GB18030 form.

3. The computer implemented method of claim 1 wherein the selecting further comprises one of a Simplified Chinese to Traditional Chinese transform and a Traditional Chinese to Simplified Chinese transform.

4. The computer implemented method of claim 1 wherein the transform further comprises a transform of one of, a single character and a phrase containing multiple characters.

5. The computer implemented method of claim 1 wherein the transform of character data input between the first writing system and the second writing system further comprises a transform of one of a one-to-one relationship and a one-to-many relationship.

6. The computer implemented method of claim 1 wherein providing the character data output further comprises:
   determining the character data input not found, returning the character data input to a user; and
   requesting the user to perform one of provide additional character data input and review a list of potential matches from which an item may be selected.

7. A data processing system for transforming character data input, the data processing system comprising:
   a bus;
   a memory connected to the bus;
   a storage unit connected to the bus, the storage unit containing computer usable program code;
   a communications unit connected to the bus;
   a display unit connected to the bus; and
   a processor connected to the bus, wherein the processing unit executes the computer usable program code to:
      receive the character data input from a first writing system;
      determine whether a transform function is enabled, and further responsive to the transform function being enabled, determining whether the character data input comprises normalized characters, and responsive to determining the character data input not normalized, normalizing the character data input to create normalized characters;
      select a predefined transform based on the character data input of the first writing system and output to a second writing system;
      transform the normalized characters of the first writing system to character data output of the second writing system; and
      provide the character data output to a display process.

8. The data processing system of claim 7 wherein the normalize step further comprises conversion from an initial form to one of a Unicode and GB18030 form.

9. The data processing system of claim 7 wherein the select step further comprises selecting one of a Simplified Chinese to Traditional Chinese transform and a Traditional Chinese to Simplified Chinese transform.

10. The data processing system of claim 7 wherein the transform step further comprises a transform of one of a single character and a phrase containing multiple characters.

11. The data processing system of claim 7 wherein the transform of character data input between the first writing system and the second writing system further comprises a transform of one of, a one-to-one relationship and a one-to-many relationship.

12. The data processing system of claim 7 wherein providing the character data output further comprises:
- determining the character data input not found, and returning the character data input; and
- requesting a user to perform one of provide additional character data input and review a list of potential matches from which an item may be selected.

13. A computer program product stored on a non-transitory computer-readable medium for directing a data processing system to transform character data, the computer program product comprising a computer program usable recordable type medium embodying one or more instructions executable by the data processing system, the one or more instructions comprising:
- data processing system executable instructions for receiving character data input of a first writing system;
- data processing system executable instructions for determining whether a transform function is enabled, and further responsive to the transform function being enabled, determining whether the character data input comprises normalized characters, and responsive to determining the character data input not normalized, normalizing the character data input to create normalized characters;
- data processing system executable instructions for selecting a predefined transform based on the character data input of the first writing system and output to a second writing system;
- data processing system executable instructions for transforming the normalized characters of the first writing system to character data output of the second writing system; and
- data processing system executable instructions for providing the character data output to a display process.

14. The computer program product of claim 13 wherein the data processing system executable instructions for normalizing further comprises data processing system executable instructions for conversion from an initial form to one of a Unicode and GB18030 form.

15. The computer program product of claim 13 wherein the data processing system executable instructions for selecting further comprises data processing system executable instructions for selecting one of a Simplified Chinese to Traditional Chinese transform and a Traditional Chinese to Simplified Chinese transform.

16. The computer program product of claim 13 wherein the data processing system executable instructions for transforming further comprises data processing system executable instructions for a transform of one of a single character and a phrase containing multiple characters.

17. The computer program product of claim 13 wherein the data processing system executable instructions for transforming of character data input between the first writing system and the second writing system further comprises data processing system executable instructions for a transform of one of, a one-to-one relationship and a one-to-many relationship.

18. The computer program product of claim 13 wherein data processing system executable instructions for providing the character data output further comprises:
- data processing system executable instructions for determining the character data input not found, returning the character data input; and
- data processing system executable instructions for requesting a user to perform one of provide additional character data input and request to review a list of potential matches from which an item may be selected.

* * * * *